US007372360B2

(12) United States Patent
Joseph

(10) Patent No.: US 7,372,360 B2
(45) Date of Patent: May 13, 2008

(54) ITEM INFORMATION SYSTEM AND METHOD

(75) Inventor: Vaiana A. Joseph, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 384 days.

(21) Appl. No.: 11/008,530

(22) Filed: Dec. 9, 2004

(65) Prior Publication Data

US 2006/0125604 A1 Jun. 15, 2006

(51) Int. Cl.
*H04Q 5/22* (2006.01)

(52) U.S. Cl. .................. 340/10.41; 340/5.91; 340/3.71

(58) Field of Classification Search ............... 340/3.71, 340/5.91, 10.41, 10.6, 572.1; 235/381
See application file for complete search history.

(56) References Cited

U.S. PATENT DOCUMENTS 4,656,563 A * 4/1987 Segoshi et al. .......... 340/573.4
5,640,002 A * 6/1997 Ruppert et al. ........ 235/462.46
5,793,029 A 8/1998 Goodwin, III
5,821,513 A * 10/1998 O'Hagen et al. ........... 235/383
6,032,127 A 2/2000 Schkolnick
6,182,053 B1 1/2001 Rauber et al.
6,269,342 B1 7/2001 Brick et al.
6,300,947 B1 10/2001 Kanevsky
6,339,762 B1 1/2002 Powell
6,354,492 B1 3/2002 Powell et al.
6,354,495 B1 3/2002 Powell
6,412,086 B1 6/2002 Friedman et al.
6,434,530 B1 * 8/2002 Sloane et al. .................. 705/1
6,484,939 B1 11/2002 Blaeuer
6,595,417 B2 7/2003 O'Hagan et al.
6,600,420 B2 7/2003 Goff et al.
6,659,344 B2 * 12/2003 Otto et al. .................. 235/381
6,885,032 B2 * 4/2005 Forbes et al. ................. 257/72

(Continued)

FOREIGN PATENT DOCUMENTS

EP 1 191 503 A2 3/2002

(Continued)

OTHER PUBLICATIONS

Visibletech-knowledgy™ Inc., Retail Electronic Shelf Labels, www.visibletech-knowledgy.com.

(Continued)

*Primary Examiner*—Edwin C. Holloway, III
(74) *Attorney, Agent, or Firm*—Roland R. Schindler

(57) ABSTRACT

An item price notification system automatically interrogates product labels to determine product, pricing, and other unique data. The system uses a radio frequency (RF) radio frequency transceiver to generate an RF field to communicate with radio frequency identification (radio frequency transponders) transponders mountable to product display shelves. The radio frequency transponders contain information such as pricing information, nutritional information, and other unique data about the various products. As the RF radio frequency transceiver moves into proximity to various radio frequency transponders for a variety of products, the unique data are received by the RF radio frequency transceiver and are displayed for the user. The displayed data allows a user to make comparisons between products, and the system display and memory allow a user to store the unique data for those products and to make instant and cumulative product, price, and other comparisons.

38 Claims, 9 Drawing Sheets

U.S. PATENT DOCUMENTS

| | | | | |
|---|---|---|---|---|
| 7,005,968 | B1 * | 2/2006 | Bridgelall | 340/10.42 |
| 2002/0005775 | A1 * | 1/2002 | Sonnendorfer et al. | 340/5.91 |
| 2002/0033794 | A1 | 3/2002 | Paulson | |
| 2002/0044103 | A1 | 4/2002 | Paulson | |
| 2002/0104246 | A1 | 8/2002 | Reynolds | |
| 2002/0120495 | A1 | 8/2002 | Powell et al. | |
| 2002/0145038 | A1 | 10/2002 | O'Hagen et al. | |
| 2002/0147597 | A1 | 10/2002 | Connors et al. | |
| 2002/0147642 | A1 | 10/2002 | Avallone et al. | |
| 2002/0165638 | A1 | 11/2002 | Bancroft et al. | |
| 2002/0165778 | A1 | 11/2002 | O'Hagan et al. | |
| 2003/0040969 | A1 | 2/2003 | O'Hagan et al. | |

FOREIGN PATENT DOCUMENTS

| | | | |
|---|---|---|---|
| EP | 1 197 905 | A2 | 4/2002 |
| EP | 1 278 146 | A2 | 1/2003 |
| EP | 1 278 166 | A2 | 1/2003 |
| EP | 1 282 058 | A2 | 2/2003 |
| EP | 1 012 761 | B1 | 4/2003 |

OTHER PUBLICATIONS

Andrew Lim et al., Singapore Management University, "A Heuristic for Shelf Space Decision Support in the Retail Industry", SMU Business Conference Paper Series, Aug. 2002, Paper No. 6-2002

Electronic Shelf Labels for Retailers, www.eldat.com.

Food Marketing Institute, "Slotting Allowances in The Supermarket Industry", pp. 1-6, www.fmi.org.

Fujitsu, "Fujitsu launches self-service revolution at Retail Business Technology 2003", http://au.fujitsu.com.

Warren Webb, "On-the-shelf electronic price labels", Nov. 14, 2004, www.reed-electronics.com.

Telecooperation Office, Germany, SmartShelf, www.teco.edu.

Raghu Das, IDTechEx Limited, "An Introduction to RFID and Tagging Technologies", 2003, pp. 1-6, www.idtechex.com.

EKSI Limited, Technical components, www.eksi.co.uk.

Randall Jackson, An Overview of RF Tags, http://home.att.net.

LeapFrog Enterprises, Inc., "Pretend and Learn Shopping Cart", 2002, www.leapfrog.com.

* cited by examiner

276a

| Item Description | Item Size | UPC Code | Serv Size | Price Per Oz | Price Per Container |
|---|---|---|---|---|---|
| Vendor E TOMATO SOUP | 16 OZ | 6036300091 | 8 OZ | $ .093 | $ 1.49 |
| Vendor D TOMATO SOUP | 14 OZ | 5114344144 | 7 OZ | $ .114 | $ 1.59 |
| Vendor J CRACKERS | 32 OZ | 9895501524 | 1 OZ | $ .087 | $ 2.79 |
| Vendor I ALMOND PASTE | 2 OZ | 5009276766 | .25 OZ | $ .999 | $ 1.99 |

FIG. 5A

276a

| Item Description | Item Size | UPC Code | Serv Size | Price Per Oz | Price Per Container |
|---|---|---|---|---|---|
| Vendor D TOMATO SOUP | 14 OZ | 5114344144 | 7 OZ | $ .114 | $ 1.59 |
| Vendor C CHICKEN SOUP | 11 OZ | 6765837591 | 11 OZ | $ .090 | $ 0.99 |
| Vendor I ALMOND PASTE | 2 OZ | 5009276766 | .25 OZ | $ .999 | $ 1.99 |
| Vendor H MARZIPAN | 7 OZ | 9879984542 | .25 OZ | $ .656 | $ 4.59 |

FIG. 5B

276a

| Item Description | Item Size | UPC Code | Serv Size | Price Per Oz | Price Per Container |
|---|---|---|---|---|---|
| Vendor C CHICKEN SOUP | 11 OZ | 6765837591 | 11 OZ | $ 0.090 | $ 0.99 |
| Vendor B HOT TUNA | 6 OZ | 5114344144 | 7 OZ | $ 0.114 | $ 0.49 |
| Vendor H MARZIPAN | 7 OZ | 9879984542 | .25 OZ | $ 0.656 | $ 4.59 |
| Vendor G NUTMEG | 2 OZ | 1357912468 | .25 OZ | $ 1.795 | $ 3.59 |

FIG. 5C

ITEM INFORMATION SYSTEM AND METHOD

FIELD OF THE INVENTION

This invention generally relates to retail pricing systems, and methods for managing pricing, consumer comparisons, and inventory of goods.

BACKGROUND OF THE INVENTION

The traditional method for informing consumers of item prices in a retail setting is to place price labels on the shelves under the items. These labels are normally made of paper or of another single-use material and must be manually updated when prices change or when an item goes on sale. There are many advantages to making this item information available electronically including greater accuracy, lower labor costs, greater flexibility, and more timely and responsive pricing practices. To achieve these advantages, electronic shelf labels may be placed on the shelves. Retailer merchandisers place electronic shelf labels on stock shelves to display item information such as the regular product price, any promotional pricing, and the unit price of the item, as well as any other advertising or consumer information. Electronic shelf labels may also be remotely updated from a central pricing database. Electronic shelf labels enable merchants to update price changes on the shelves and checkout stands of multiple stores at the same time.

These electronic shelf labels are programmed using radio frequency or infrared (IR) interfaces, or by wiring the shelves to accept periodic inputs from another device. But there are disadvantages to pricing methods using electronic shelf labels. Power and communication means must be provided to the individual labels. If batteries are used to provide power to each label, they must be changed on a regular basis. With 30,000 items in a supermarket, this could be prohibitive. Wired shelves do not require the routine change of batteries, but they limit a store's ability to reallocate shelf space and reconfigure the shopping aisles by moving display shelves since each shelf is now specifically wired for a particular product.

Additionally, electronic shelf labels do not provide the consumer with item information in a side-by-side comparison of similar products. The consumer must manually locate and inspect each individual electronic shelf label and use these individual labels to mentally track and compare quantities, pricing, and other unique item data. Similar products may be located further down the aisle or on a shelf higher or lower than the consumer is able to properly perceive or comfortably investigate. Comparisons are often made only between two adjacent items, and the consumer is not able to adequately evaluate his retail alternatives. In fact, suppliers pay thousands of dollars in slotting allowances to distributors for product placement on store shelves. Premiums are paid for eye-level shelves or special displays, and an entire science of shelf space allocation has evolved so suppliers may increase the likelihood that consumers will consider their products and ultimately select those products for purchase. However, neither electronic shelf labels nor paper labels adequately provide consumers with readily comparable item data from which to base their purchase decisions.

What is needed is a new type of item information system that provides consumers with unique item data and enables consumers to make immediate comparisons between similar items resulting in an informed purchase decision.

In another approach, price-checking stations have been provided in retail environments that are adapted to read a barcode and provide price information. More recently, radio frequency transponders have been proposed to replace barcodes in a wide variety of applications. Such radio frequency transponders are typically capable of receiving a radio frequency interrogation signal and automatically generating a responsive radio frequency signal. In many applications, the responsive signal contains some form of data that identifies the transponder or that identifies items associated with the transponder. Radio frequency transponders are often embedded in products or product containers and are used to track items for inventory control, for performing security operations and anti-theft measures, for collecting tolls and other payments, and for many other purposes.

Radio frequency transponders can be active devices that have internal power source and have their own radio frequency transmitters that can generate signals using the internal power source, or passive devices, that do not have an internal power source and that can provide responsive signals only when sufficient power is supplied by an interrogation signal. Radio frequency transponders may have a range from several millimeters to many meters depending upon the available transmission power and antenna size. Radio frequency transponders employing on-board power supplies have a life limited by the life of the power supply. Passive radio frequency transponders have a longer useful life and are typically less expensive than radio frequency transponders with on-board power supplies. However, since radio frequency transponders without their own power source use some of the energy of the radio frequency transceiver as their source of their power, these radio frequency transponders typically require a more powerful radio frequency interrogating signal than a system that employs active radio frequency transponders.

A radio frequency transceiver transmits an interrogation signal, for example, in the form of continuous electromagnetic wave or a series of waves to sense an object containing a radio frequency transponder. When the radio frequency transceiver and a radio frequency transponder are brought into proximity so that the radio frequency field generated by the radio frequency transceiver reaches the radio frequency transponder, the receiving radio frequency transponder transmits a modulated signal in response to the radio frequency transceiver's interrogation signal. The radio frequency transceiver receives this information and decodes it. Depending upon the configuration of the radio frequency transceiver, this decoded information may then be stored or re-transmitted to a host computer for further processing and action.

While the potential convenience of placing such radio frequency transponders on individual products to replace barcodes, for example in retail environments, is well appreciated, the cost of providing such transponders for each product is currently prohibitive.

SUMMARY OF THE INVENTION

The present invention is a system and method of alerting consumers to the presence of nearby items and providing item information that can be reviewed while the consumers are shopping. In certain aspects of the invention, this allows, for example, a direct comparison of similar goods and products. The present invention provides an item information device that utilizes a radio frequency transceiver to automatically transmit interrogation signals to radio frequency transponders that are located proximate to retail shelves having items thereon and to allow the consumers to access unique item data that is stored in the radio frequency transponders. When interrogated, radio frequency transponders associated with the items on the retail shelves respond with the Universal Product Code (UPC) and other unique data of the products with which the radio frequency transponders are associated. As the radio frequency transceiver is moved into proximity to various radio frequency transponders, the unique data are displayed for the user. The system and method of the present invention allows a user to make comparisons between products based upon a variety of criteria associated with the products. Some embodiments of the system and method of the present invention, further allow a user to store the unique data for those products and to make preliminary and ultimate product and price comparisons and purchase decisions.

The present invention uses radio frequency transponders that, once placed on the shelves, no longer require a power source and can easily be moved with the product or display area as needed and can easily be up. In certain embodiments, a portable item information device is provided and can, for example, be joined to a shopping cart or like customer item carrier. The portable item information device contains a radio frequency transceiver, which sends interrogation signals that solicits responses from proximate transponders from which the item information device can identify items in its vicinity as the shopping cart is moved about. The portable item information device has a display that that can be used to provide an image having graphics and text or other content, and a controller that is adapted to determine output data for presentation on the display, and to cause the display to show such item information such as item names, prices, unit prices and other unique data such as pictorial or graphic representations associated with the items. Sale items may be indicated by a flashing display or some other attention-getting graphic. In some embodiments, the display program may show a running total price of the items selected or a running total of calories or other unique data inherent to the individual product. The consumer may select any number of criteria to compare similar products. In this fashion, the system and method of the present invention gives the consumer immediate feedback regarding which items are nearby, which items are available as potential purchases, allows consumers to compare similar items prior to purchase selection, and gives consumers information to avoid potential discrepancies and expedite checkout.

BRIEF DESCRIPTION OF THE DRAWINGS

The above-mentioned and other features and objects of this invention and the manner of attaining them will become more apparent, and the invention itself will be better understood by reference to the following description of the invention taken in conjunction with the accompanying figures where:

FIGS. 5A, 5B, and 5C show examples of display screens of the present invention in use in a retail environment.

DETAILED DESCRIPTION OF THE INVENTION

The invention is described in detail with particular reference to certain preferred embodiments, but within the spirit and scope of the invention, it is not limited to such embodiments. It will be apparent to those of skill in the art that various features, variations, and modifications of the invention can be included or excluded, within the limits defined by the claims and the requirements of a particular use.

The present invention extends the capabilities of shoppers in a retail environment to locate goods and to compare characteristics of similar goods and products. The various embodiments of the present invention have particular advantages over prior systems such as those providing basic pricing information of goods selected and placed in a shopping cart, because a direct comparison of similar goods is now possible without removing the various products under consideration from their display shelves or display areas. In addition to a comparison of similar products, the present invention is a system and method for item price notification that provides a shopper with numerous customizable comparison points.

Figure 1:
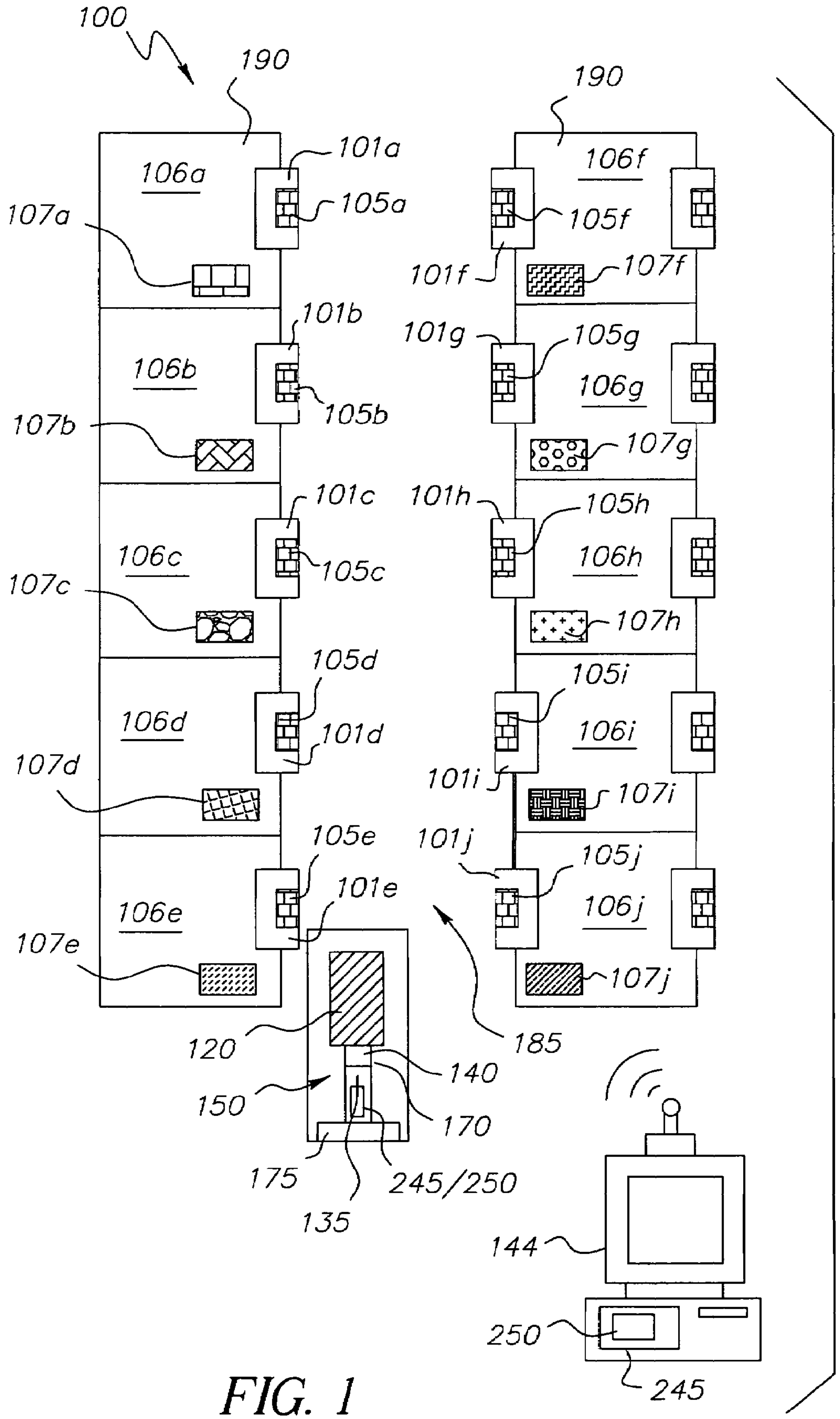
FIG. 1 is an overview block diagram of the invention in use in a typical retail environment.

FIG. 1 is a block diagram showing a sales environment 100 adapted with one embodiment of the item information system of the invention. Sales environment 100 is shown having multiple display shelves 190, each outfitted with shelf tags 101. Display shelves 190 may also be cabinets, racks, kiosks, or any other type of storage unit that permits customer and employee access to inventory items. Each shelf tag 101 contains a radio frequency transponder 105. In this embodiment, each type of unique item 107 stored on display shelves 190 is associated with a passive radio frequency transponder 105, which has item information stored therein and which generates a responsive signal indicative of the item information when a radio frequency transceiver that is within a proximate distance generates an appropriate interrogation signal. That is, each unique item 107 does not have a radio frequency transponder 105, but rather there is a single radio frequency transponder 105 for the shelf space 106 dedicated to stocking unique item 107. It will be appreciated that, in other embodiments, one transponder 105 can be associated with more than one unique item that is located proximate to transponder 105.

For example, cans of one vendor's (Vendor E) tomato soup can be stored in shelf space 106, on display shelf 190 with radio frequency transponder 105*e*. When interrogated, radio frequency transponder 105*e* having data therein that is indicative of the item information, transmits a responsive signal that is indicative of the item information such as information used to denote the vendor, the price of the can of soup, the volume or weight of the soup, the per unit price of the soup, the recommended serving size, the number of calories in each serving, and other item information for which consumers may be interested. Similarly, radio frequency transponder 105*d* will be adapted to transmit similar information regarding unique items 107*d* stored in shelf space 106*d*. While the above list of item information may contain many of the most desired data regarding the product, it is by no means inclusive, and other item information may be transmitted by radio frequency transponders 105 to provide consumers with additional information. One of ordinary skill in the art would be expected to customize the transmitted information based upon consumer's preferences, vendor's needs, and/or proprietor's differences. This information would then be stored as information fields in radio frequency transponder 105.

The block diagram of FIG. 1 further shows shopping cart 170 equipped with a portable item information device 150 having, in this embodiment, a display screen 175, memory 135, a control circuit 140 and radio frequency transceiver circuit 120 adapted to generate an interrogation signal that has sufficient power so that the polling signal can be received by any of the plurality of radio frequency transponders within a proximate distance and further supplying sufficient power to the transponders so that the transponders can use the supplied power to generate responsive signals having data indicative of the item information stored therein; the radio frequency transceiver circuit further being adapted to sense the responsive signals and to provide item data to a control circuit based upon the data in the responsive signals. Control circuit 140 is operably connected to radio frequency transceiver circuit 120, memory 135 and display screen 175. Control circuit 140 can comprise a microprocessor, micro-controller, application specific integrated circuit and/or other conventional control circuit structures. Control circuit 140 is adapted to receive the item data from transceiver circuit 120 to determine output information based upon the received item data and to cause display screen 175 to present an image based upon the output information.

Figure 2:
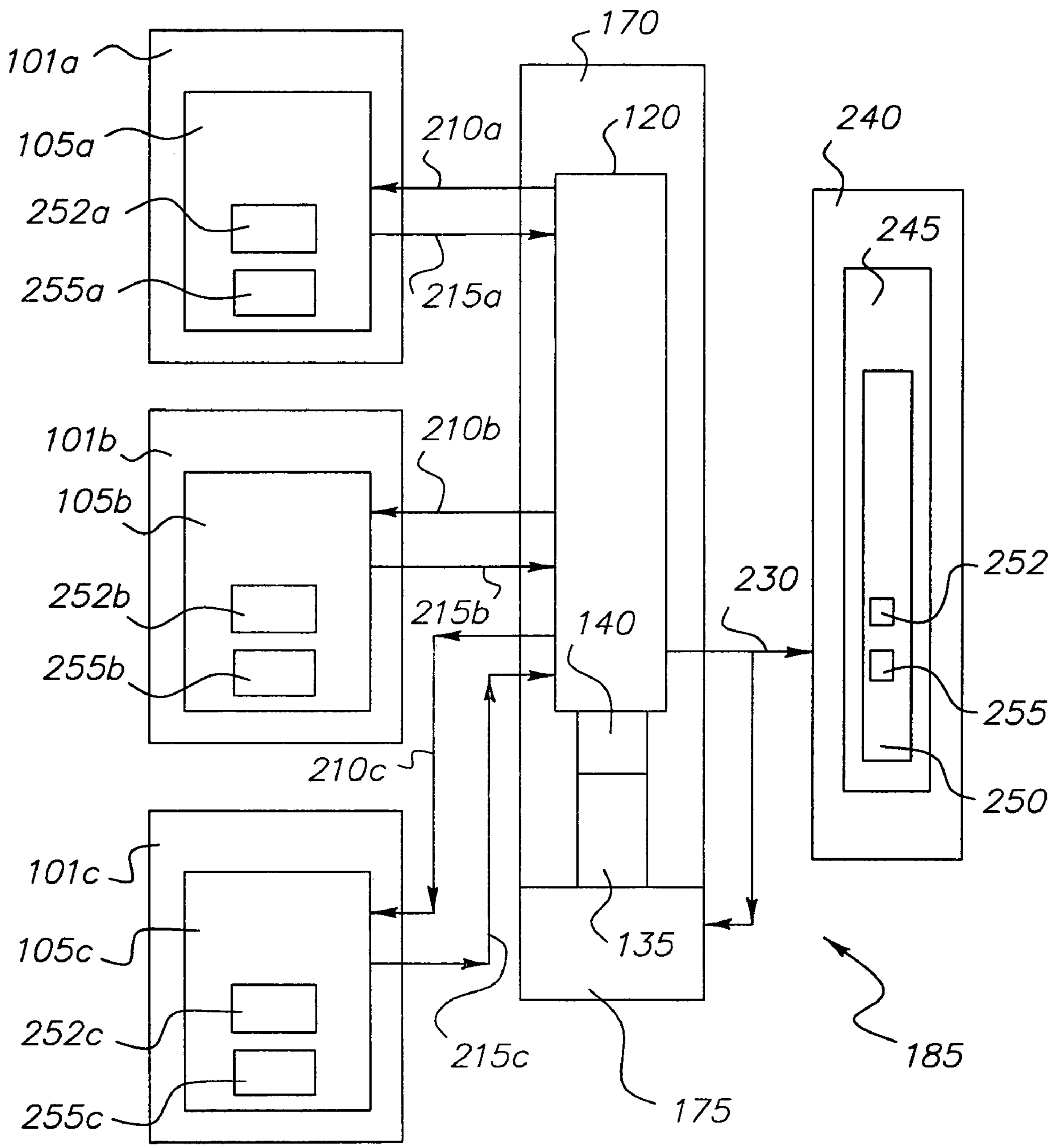
FIG. 2 is a block diagram of the interaction between radio frequency transponders, a radio frequency transceiver, and computer system of the present invention.

FIG. 2 illustrates interaction between portable item information device 150 as a customer moves shopping cart 170 down aisle 185 in sales environment 100.

As shown in FIG. 2, radio frequency transponder 105 stores information related to items in the form of an entry 252, and other information fields 255 that correspond to entry 252. While only a single entry 252 and field 255 is shown for each radio frequency transponder 105, many more entries and fields may be stored in each radio frequency transponder. These entries 252 and information fields 255 are used to convey necessary item information regarding each unique item 107. While many more shelf tags 101 and corresponding radio frequency transponders 105 may be used on any display shelf 190, for illustrative purposes as shown in FIG. 2, and for brevity, three shelf tags 101*a*, 101*b*, 101*c*, and three corresponding radio frequency transponders 105*a*, 105*b*, and 105*c* are shown.

As further shown in FIG. 2, radio frequency transceiver circuit 120 transmits an interrogation signal 210 which is also tuned to the detection frequency of radio frequency transponder 105. As shopping cart 170 is pushed down aisle 185, it is brought into proximity with radio frequency transponders 105*a*, 105*b*, 105*c* which are thereby subjected to interrogating signals 210*a*, 210*b*, 210*c*. In response to the interrogation signals, radio frequency transponders 105*a*, 105*b*, 106*c* generate responsive signals 215*a*, 215*b* and 215*c* respectively. Responsive signals 215*a*-215*c* are detected by radio frequency transceiver circuit 120 thereby indicating the presence of shelf tags 101 within the proximate distance of radio frequency transceiver circuit 120. Typically, the proximate distance is controlled by three factors, the strength of the interrogation signals 210, the efficiency with which transponders 105 convert energy from an interrogation signal into a responsive signal, and the receptive sensitivity of radio frequency transceiver circuit 120.

Responsive signals 215 received by radio frequency transceiver circuit 120 are converted into item data that is provided to control circuit 140 which determines output information based upon the received item data. The output information can contain item data or be derived from item data, and the prepared image can be formed to show the data received, a summary of the item data received, and/or to show output information obtained from a database 245 having one or more records 250 that have such output information stored therein in association with the item data so that output information, such as an advertisement for a product can be obtained from database 245 using received item data. The item data received from radio frequency transceiver circuit 120 can also be channeled to external devices, such as a remote server 144, which can have database 245 from which a control circuit 140 can receive other output information and can prepare an image based upon the available output information. Display screen 175 then shows the prepared image, including item data, in a readable format that a consumer may readily manipulate via input keys (not shown) on display screen 175. Display screen 175 can be any suitable display screen including a touch screen device or a display screen manufactured by using coated cholesteric LCD technology. Coated cholesteric displays have the advantages of size, flexibility, ease of replacement, and durability since they are glass-free which is a safety consideration in a consumer environment. Since radio frequency transceiver circuit 120 continually transmits interrogation signals 210 to radio frequency transponders 105, and thereby continually receives responsive signals 215 from radio frequency transponders 105, a steady stream of item information is received and images can be prepared based upon this and displayed as a consumer moves shopping cart 170 down aisle 185.

Based upon the sensitivity and transmission power of radio frequency transceiver circuit 120 and the ability to multiplex transmission and reception of interrogation signals 210 and responsive signals 215, a plurality of radio frequency transponders 105 may be read substantially simultaneously. Because the transmission interaction between radio frequency transceiver circuit 120 and radio frequency transponders 105 is substantially continuous, item updated images can be presented on display screen 175 based upon data stored by radio frequency transponders 105 as entry 252 and fields 255.

Figure 3:
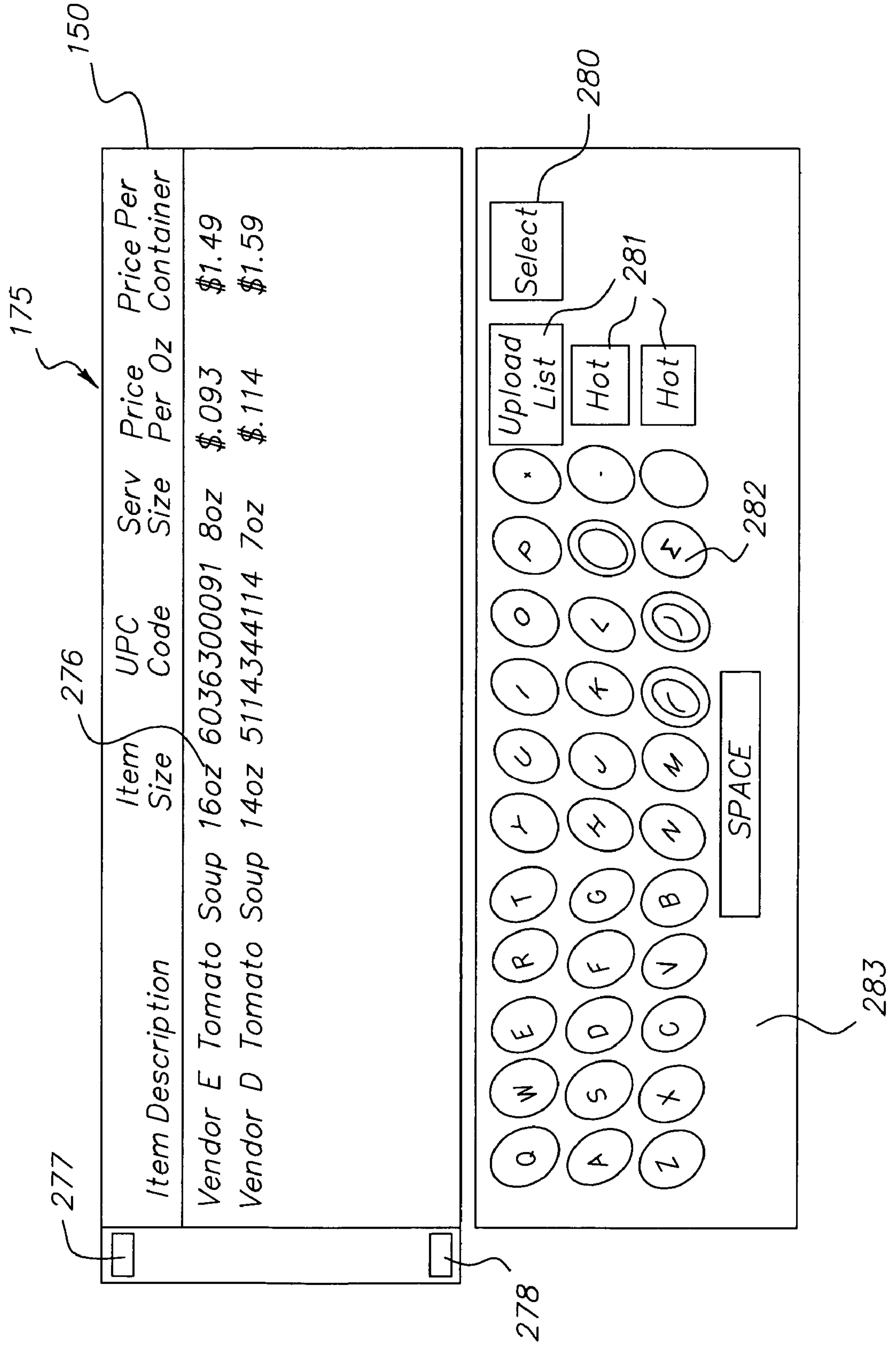
FIG. 3 shows an exterior view of one embodiment of a portable item information system presenting an image.

Referring back to FIG. 1, when a consumer moves or parks his shopping cart 170 in front of the shelf tag 101*e*, control circuit 140 prepares an image that presents information regarding a plurality of unique items 107*d*, 107*e* and causes this image to be displayed as shown in the example of display screen 175 in FIG. 3.

FIG. 3 shows an exterior view of one embodiment of a portable item information device 150 presenting an image 276 that is the result of the transmission interaction between radio frequency transceiver circuit 120 and radio frequency transponder 105*e* corresponding to Vendor E's tomato soup, and between radio frequency transceiver circuit 120 and radio frequency transponder 105*d* corresponding to Vendor D's tomato soup. The exchange of interrogation signal 210 and responsive signal 215 results in the generation of image 276 based upon data that was previously stored by corresponding radio frequency transponder 105 in entry 252 and fields 255.

Shopping cart 170 can be moved down aisle 185 at different speeds or linger in front of display shelf 190 and shelf tag 101 for different periods of time. Regardless of the speed movement, as shopping cart 170 is moved through aisle 185, radio frequency transceiver circuit 120 is brought into a proximate distance with different shelf tags 101 along aisle 185 and image 276 presented on display screen 175 reflects unique items 107*d*, 107*e* within the proximity distance of shopping cart 170 and radio frequency transceiver circuit 120. As shopping cart 170 is further moved along aisle 185, radio frequency transceiver circuit 120 is brought into proximity with different unique items 107 and different shelf tags 101, and control circuit 140 can adjust image 276 to reflect such newly proximate items.

Such movement also adjusts the position of proximate distance so that radio frequency transponders 105 previously detected, are now outside of the proximate distance since their shelf tags 101 are now beyond the distance where transceiver circuit 120 will receive a responsive signal 215 from radio frequency transponder 105, when radio frequency transceiver circuit 120 does not sense previously detected shelf tags 101, control circuit 140 will adjust the appearance of image 276 so that it is no longer based upon item information from transponders 105 on such shelf tags.

As shown in FIG. 3, regardless of the structure upon which the invention is incorporated, once image 276 is presented on display screen 175, the user may manipulate the viewable image 276 by performing a number of operations on the information. For example, a user may use scroll-up bar 277 and scroll-down bar 278 and then the select key 280 to store a displayed item in memory for later recall to determine a running total of the price of goods selected for purchase by using the total key 282. Additionally, one or more sections of image 276 can be selected using select key 280 and operated upon using programmable hot keys 281 to store and track information to provide a total number of calories for a consumer planning a menu. Image 276 can be displayed on display screen 175, and programmable hot keys 281 can be programmed by the seller of goods or by the user to provide consumers' with manipulation options to further enhance the shopping experience and to provide valuable information. For example, responsive signals may be received from a radio frequency transponder associated with a shopper prior to beginning the shopping journey through a store. The radio frequency identification input from the shopper can be used to upload a shopping list or a list of favorite items or additional information unique to the shopper. This type of external input can be facilitated through the use of programmable hot keys. Keyboard 283 can be used to provide input to assist in setting up programmable hot keys 281 and to otherwise edit information shown on display screen 175.

In this fashion, a consumer could use display screen 175 to view a running total of the price of items selected, a running calorie count for items selected, or as a display point to compare any information presented by display screen 175 with stored information pertinent to items the consumer is considering for purchase.

Figure 4A:
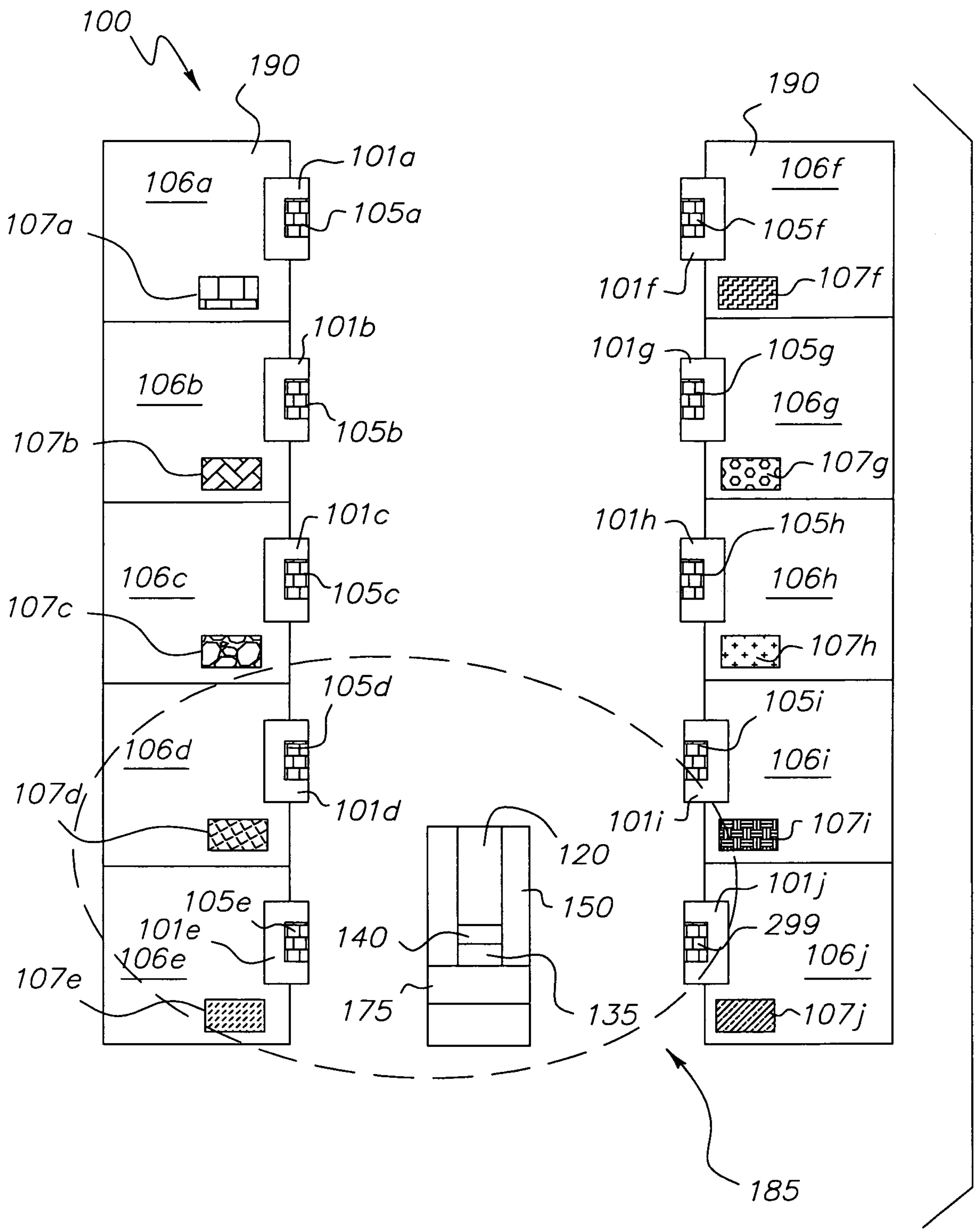
FIGS. 4A, 4B, and 4C show examples of the present invention in use in a retail environment.
Figure 4B:
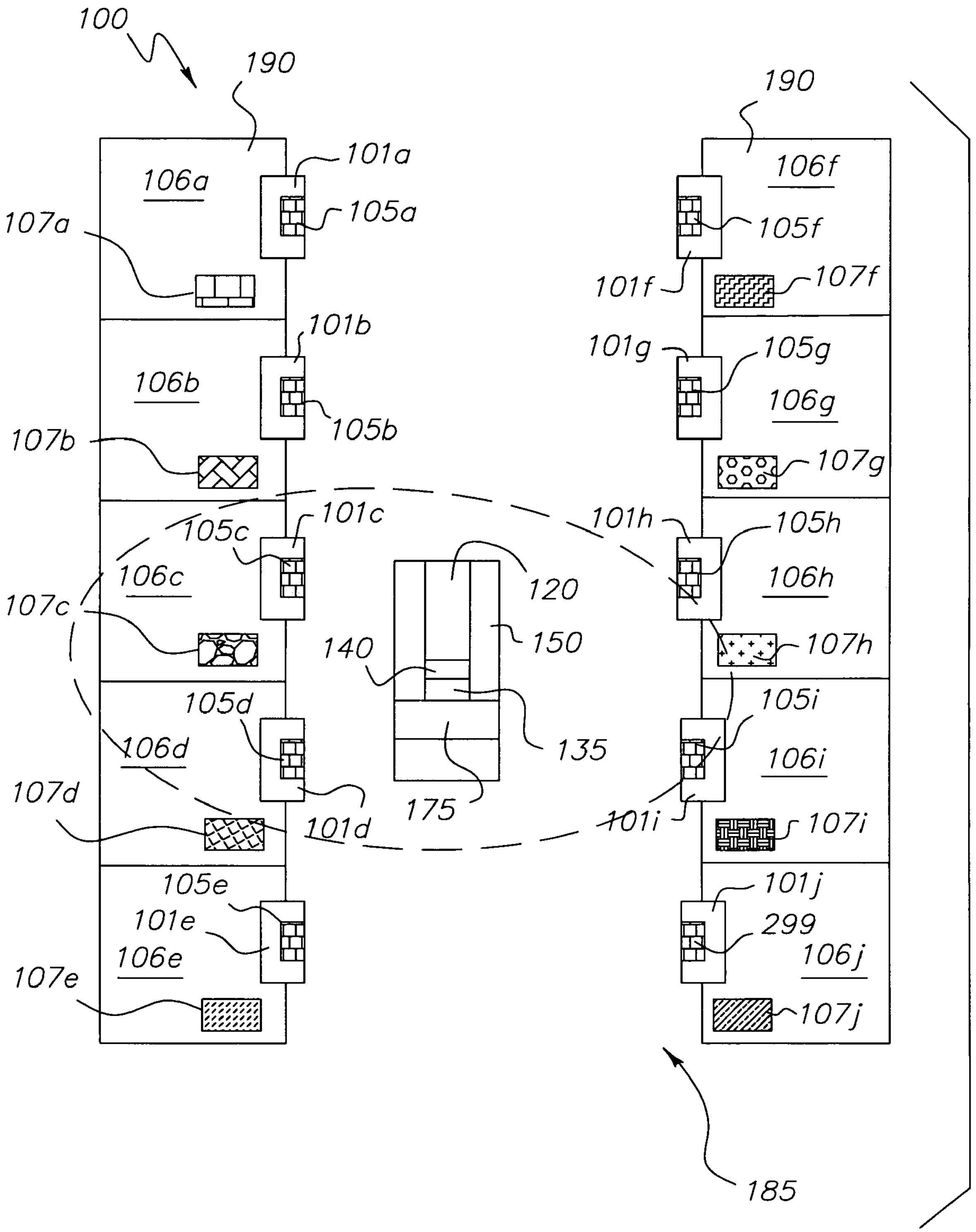
Figure 4C:
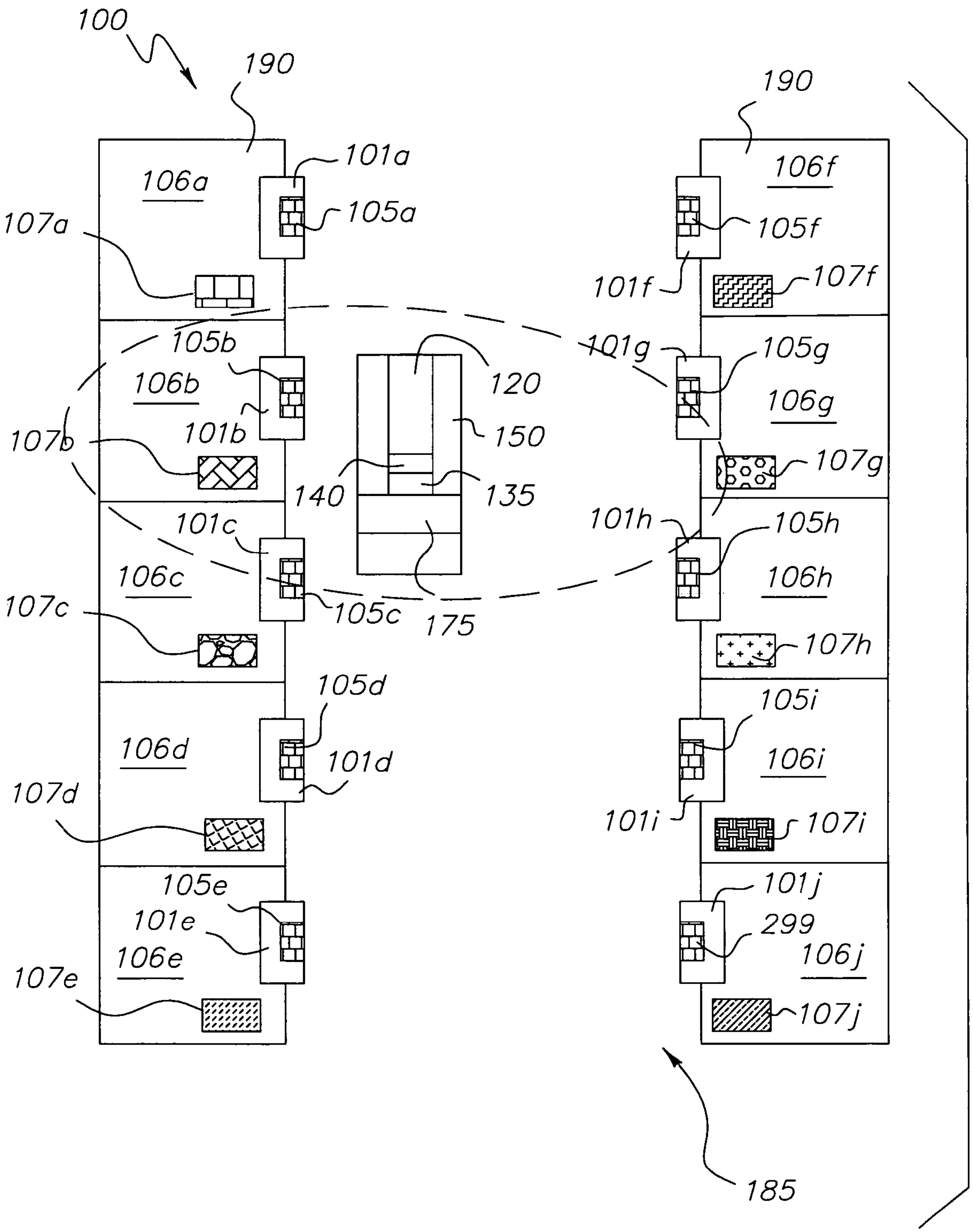

FIGS. 4A, 4B, and 4C show an example of radio frequency transponders 105 in shelf tags 101 that come within a proximate distance 299 (shown by dotted line around shopping cart 170) of radio frequency transceiver circuit 120 in a portable item information device 150. For clarity, reference numerals are shown in FIG. 4A only, and FIG. 4B and FIG. 4C show the travel of shopping cart 170 and the corresponding change in proximate distance 299. The objects depicted in FIG. 4B and FIG. 4C are identical to those shown and denoted by reference numerals in FIG. 4A.

FIG. 4A shows shopping cart 170 in an initial position where proximate distance 299 encompasses shelf tags 101*d*, 101*e*, 101*i*, 101*j*. In this initial position, radio frequency transceiver circuit 120 transmits radio frequency interrogation signals, and radio frequency transponders 105*d*, 105*e*, 105*i*, 105*j* answer by providing responsive signals as described previously. The responsive signals are detected by radio frequency transceiver circuit 120 indicating the presence of shelf tags 101*d*, 101*e*, 101*i*, 101*j*. Image 276 is presented on display screen 175 based upon these responsive signals from shelf tags 101*d*, 101*e*, 101*i*, 101*j*. Since shelftags 101*a*, 101*b*, 101*c*, 101*f*, 101*g*, 101*h* are beyond proximate distance 299, radio frequency transponders 105*a*, 105*b*, 105*c*, 105*f*, 105*g*, 105*h* do not receive interrogation signals, do not generate a responsive signal, or alternatively do not generate a responsive signal that can be sensed by radio frequency transceiver circuit 120.

FIG. 5A shows an example image 176 corresponding to the shopping cart position shown in FIG. 4A. In the example illustrated in FIGS. 4A and 5A, unique item 107*e* is a can of Vendor E tomato soup, while unique item 107*d* is a can of Vendor D tomato soup. Additionally, proximate distance 299 also encompasses the other side of aisle and thereby receives data from radio frequency transponders 105*i*, 105*j* located in shelf tags 101*i*, 101*j*. While these unique items 107*i*, 107*j* may be of a completely different food group and genre, since these radio frequency transponders 105*i*, 105*j* respond to an interrogation signal from radio frequency transceiver circuit 120, image 276*a* also reflects these items as well as shown in FIG. 5A.

FIG. 4B shows shopping cart 170 in an intermediate position as it is moved further along aisle 185. Since shopping cart 170 is now in a new position, proximate distance 299 now encompasses shelf tags 101*c*, 101*d*, 101*h*, 101*i*. In this intermediate position, radio frequency transceiver circuit 120 transmits interrogation signals, and radio frequency transponders 105*c*, 105*d*, 105*h*, 105*i* answer by providing responsive signal that are detected by radio frequency transceiver circuit 120 indicating the presence of shelf tags 101*c*, 101*d*, 101*h*, 101*i*. Control circuit 140 determines new output information based upon item data in responsive signals detected by radio frequency transceiver circuit 120 from radio frequency transponders 105*c*, 105*d*, 105*h*, 105*i*. An image 276*b* is then prepared by control circuit 140 based upon this output information and image 276*b* is shown on display screen 175. Since shelf tags 101*a*, 101*b*, 101*e*, 101*f*, 101*g*, 101*j* are now beyond the proximate distance 299 of radio frequency transceiver circuit 120. Radio frequency transponders 105*a*, 105*b*, 106*e*, 105*f*, 105*g*, 105*j* do not receive interrogation signals, do not generate a responsive signal or, alternatively, they do not answer in a manner that radio frequency transceiver 120 can sense.

FIG. 5B shows an image 176*b* presented on display screen 175 corresponding to the shopping cart position shown in FIG. 4B. In the example illustrated in FIGS. 4B and 5B, unique item 107*c* is a can of Vendor C chicken-noodle soup, while unique item 107*d* is a can of Vendor D tomato soup. Additionally, proximate distance 299 also encompasses the other side of aisle 185 and thereby receives data from radio frequency transponders 105*h*, 105*i* located in shelf tags 101*h*, 101*i*. While these unique items 107*h*, 107*i* may be of a completely different food group and genre, since these radio frequency transponders 105*h*, 105*i* respond to interrogation signals from radio frequency transceiver circuit 120, viewable image information 176*b* is also generated and displayed based upon the detected presence of these items as well as shown in FIG. 5B.

Finally, FIG. 4C shows shopping cart 170 in a final position as it is moved further along aisle 185. Since shopping cart 170 is now in a new position, proximate distance 299 now encompasses shelf tags 101*b*, 101*c*, 101*g*, 101*h*. In this position, radio frequency transceiver circuit 120 transmits interrogation signals, and radio frequency transponders 105*b*, 105*c*, 105*g*, 105*h* answer by providing data in the form of an output signal. Responsive signals detected by radio frequency transceiver circuit 120 are then used to form an image 276*c* which is then presented on display screen 175. Since shelf tags 101*a*, 101*d*, 101*e*, 101*f*, 101*i*, 101*j* are now beyond the proximate distance 299 of radio frequency transceiver circuit 120, radio frequency transponders 105*a*, 105*d*, 105*e*, 105*f*, 105*i*, 105*j* do not receive interrogation signals, do not generate a responsive signal or alternatively, do not generate a response signal that can be sensed by radio frequency transceiver circuit 120.

FIG. 5C shows image 276*c* presented on display screen 175 when shopping cart 170 is positioned as shown in FIG. 4C. In an example illustrated in FIGS. 4C and 5*c*, unique item 107*b* is a can of Vendor B chicken-noodle soup, while unique item 107*c* is a can of Vendor C chicken-noodle soup. Additionally, proximate distance 299 also encompasses the other side of aisle 185 and thereby receives data from radio frequency transponders 105*g*, 105*h* located in shelf tags 101*g*, 101*h*. While these unique items 107*g*, 107*h* may be of a completely different food group and genre, since these radio frequency transponders 105*g*, 105*h* respond to an interrogation signal from radio frequency transceiver circuit 120, image 176*c* reflects these items as well, as shown in FIG. 5C.

As may be apparent from the above example, and as discussed above with regard to transmission power and reception sensitivity, the orientation of antennae in radio frequency transponder 105 and radio frequency transceiver circuit 120 may be modified to alter the shape, direction, and distance of proximate distance 299 to optimize the exchange of interrogation signals and responsive signals indicative of item information and characteristics of unique items in the store. By modifying the shape and size of proximate distance 299, different retail establishments may optimize displays based upon consumer preferences, relative sizes of items and display shelves, width of aisles, and any number of other variables in a sales environment.

Additionally, portable item information device 150 can be mounted in structures other than shopping carts to permit users more freedom of movement in a sales environment. For example, portable item information device 150 may be mounted in a plastic shopping basket or incorporated in a handheld device such as a personal digital assistant or other mobile computing device.

The invention has been described in detail with particular reference to certain preferred embodiments, but it will be understood that variations and modifications can be effected within the spirit and scope of the invention.

PARTS LIST

100 sales environment
101 shelf tag
101*a*-101*j* shelf tag
105 radio frequency transponder
105*a*-105*j* radio frequency transponder
106 shelf space
106*a*-106*j* shelf space
107 unique item
107*a*-107*j* unique item
120 radio frequency transceiver circuit
135 memory
140 control circuit
144 remote server
150 item information device
170 shopping cart
175 display screen
176 display image
176*a*-176*c* display image
185 aisle
190 display shelf
210 interrogation signal
215 responsive signal
215*a*-215*c* responsive signal
245 database
250 record
252 entry
255 field
276 image
276*a*-276*c* image
277 scroll-up bar
278 scroll-down bar
280 select key
281 hotkey
282 total key
283 keyboard
299 proximate distance

The invention claimed is:

1. An item information for items stored in groups on display shelves, the system comprising:

a plurality of radio frequency transponders each having item information stored therein that is related to items stored on the display shelves proximate to the transponder; and a portable item information device having:

a radio frequency transceiver circuit adapted to generate an interrogation signal that has sufficient power so that the interrogation signal can be received by any of the plurality of radio frequency transponders within a proximate distance and further supplying sufficient power to said transponders so that the transponders can use the supplied power to generate responsive signals having data indicative of the item information stored therein; said radio frequency transceiver circuit further being adapted to sense the responsive signals and to provide item data to a control circuit based upon the data in the responsive signals;

said control circuit being adapted to receive the item data, to determine output information based upon the received item data and to cause a display to generate an image based upon the output information.

2. The item information system of claim 1, further comprising a memory, operatively connected to the display screen and the control circuit for storing data based upon the received item data.

3. The item information system of claim 1, wherein each radio frequency transponder includes a passive transponder.

4. The item information system of claim 1, wherein item data includes data from which the control circuit can determine at least one an item description, an item package size, an item package price, and a unit price of the item.

5. The item information system of claim 1, wherein the output data includes at least an advertisement for at least one item for which item data is received.

6. The item information system of claim 1, wherein the radio frequency transceiver, the control circuit and the display screen are mounted to a shopping cart.

7. The item information system of claim 1, wherein the plurality of radio frequency transponders within proximity to the radio frequency transceiver each provide a responsive signal having unique item data to the radio frequency transceiver, the radio frequency transceiver communicates the unique data to the control circuit and the control circuit is adapted to generate a output data for presentation as an image on the display screen substantially simultaneously, thereby allowing a comparison of the item data received from each of the plurality of radio frequency transponders.

8. The item information system of claim 7, wherein the image does not include output data for an item when the radio frequency transponder is beyond the proximate distance.

9. The item information system of claim 2, further comprising a user interface adapted to sense a user action designating output data from at least one of the plurality of radio frequency transponders and storing the item data in the memory indicative of the selection, the item selected, or the type of information selected.

10. The item information system of claim 9, further comprising a means for manipulating the selected item data using mathematical operations.

11. The item information system of claim 9, wherein the display screen further comprises a flexible cholesteric liquid crystal display.

12. A method of shopping and product comparison using a plurality of radio frequency transponders, each associated with particular portion of display shelves having items thereon wherein each radio frequency transponder stores unique item data for items located proximate thereto in a remotely readable form, the method comprising the steps of:

transmitting a radio frequency interrogation signal adapted to cause ones of the plurality of radio frequency transponders that are proximate to location at which the radio frequency transceiver signal is transmitted to respond with a unique signal having item data therein said item data at least identifying each of a plurality of unique types of items stored on the display shelves proximate to each one of the transponders; and receiving each of the unique signals and extracting item data therefrom;

converting the unique item data into a viewable form; and displaying the viewable form.

13. The method of claim 12, wherein the radio frequency interrogation signal is adapted to generate a signal having a strength that is adapted to be usable only by transponders that are within a range of positions proximate to the location at which the radio frequency transceiver signal is generated.

14. The method of claim 12, wherein the radio frequency transponders are adapted to generate responsive signals using power supplied by the radio frequency interrogation signals, so that the radio frequency transponder will not generate a responsive signal if a radio frequency interrogation signal is sensed by the radio frequency transponder lacks sufficient power to enable the radio frequency transponder to generate a responsive signal.

15. The method of claim 12, further comprising the step of storing received item data in a memory.

16. The method of claim 12, wherein the step of transmitting an interrogation signal comprises the step of using an antenna operatively connected to a transceiver to generate an interrogation signal in the form of a radio frequency field in proximity to each of the radio frequency transponders on the display shelves.

17. The method of claim 12, wherein the displaying step further comprises the steps of displaying at least an item description, an item package size, an item package price, and an item unit price.

18. The method of claim 12, wherein the displaying step further comprises the step of displaying an advertisement for the item.

19. The method of claim 12, wherein the step of displaying the item information from each of the plurality of radio frequency transponders within proximity to the radio frequency transceiver occurs substantially simultaneously, thereby allowing a displayed comparison of product related information based upon the item data received from each of the plurality of radio frequency transponders.

20. The method of claim 19, wherein the displayed information is adjusted so that item information that is based upon data obtained from a transponder that is beyond a proximate distance from a source of the interrogation signal is no longer displayed on the display screen when that radio frequency transponder.

21. The method of claim 20, further comprising the steps of sensing a user action designating item data from at least one of the plurality of radio frequency transponders and storing the item data in the memory indicative of the selection, the item selected, or the type of information selected.

22. The method of claim 12, further comprising the step of using the display screen to manipulate the item data using mathematical operations.

23. The method of claim 22, wherein the mathematical operation is calculating a running total of the price of items selected by a user.

24. The method of claim 23, wherein the mathematical operation is calculating a running total of the calories present in items selected by a user.

25. The method claim 12, further comprising the step of creating a shopping list of items by receiving external consumer preference data and adapting the viewable form based upon the consumer preference data to display items for which a shopper is searching.

26. The method of claim 12, wherein the unique item data comprises an item identification code, and wherein the step of converting the unique item data into a viewable form comprises using the item identification code to obtain other information relevant to the item from a memory and to present a viewable form indicative of the obtained information.

27. The method of claim 26, wherein the step of using the item data to obtain other information comprises transmitting a signal having the item data to a remote memory and receiving other information relevant to the item from the remote memory.

28. An item information device for use with item storage areas and a plurality of radio frequency transponders associated with the storage areas, the transponders having item data stored therein, the item information device comprising:

said item data at least identifying each of a plurality of unique types of items stored in the storage areas proximate to each one of the radio frequency transponders;

a display for presenting formed images; and a radio frequency circuit adapted to receive radio frequency signals having the item data from at least one radio frequency transponder and to communicate the item data to a control circuit, the control circuit being adapted to form images for presentation on the display based upon item data received by the control circuit and to cause the display to present the formed images;

wherein the radio frequency circuit is further adapted to transmit a radio frequency signal that causes the radio frequency transponders to transmit the radio frequency signals having the item data.

29. The item information device of claim 28, wherein the radio frequency circuit comprises:

a transceiver, including a transmission portion and a reception portion; and an antenna, operatively connected to the transceiver, for generating a radio frequency field in proximity to at least one radio frequency transponder located proximate to at least one item on a shelf.

30. The item information device as in claim 28, wherein the item data presented on the display includes at least an item description, an item package size, an item package price, and a unit price of the item.

31. The item information device of claim 28, wherein the item data displayed on the display includes at least an advertisement for the item.

32. The item information device of claim 28, wherein the radio frequency circuit, the control circuit, and the display are mounted to a shopping cart.

33. The item information device of claim 28, further comprising a power supply for supplying power to the radio frequency circuit, the control circuit and the display wherein at least one radio frequency transponder within a proximate distance to the radio frequency circuit each communicate unique data to the radio frequency circuit and the radio frequency circuit communicates the item data to the display substantially simultaneously, thereby allowing a comparison of the item data received from each of the at least one radio frequency transponders.

34. The item information device as in claim 33, wherein the item data is no longer displayed on the display when a radio frequency transponder is beyond a proximate distance.

35. The item information device as in claim 33, wherein the display comprises means for selecting the item data from each of the at least one radio frequency transponders and storing the item data in a memory.

36. The item information device of claim 35, wherein the display further comprises means for manipulating the item data using mathematical operations.

37. The item information device as in claim 36, wherein the display further comprises a flexible cholesteric liquid crystal display.

38. The item information device comprising:

a plurality of radio frequency transponder means each having memory means therein adapted to store item data indicative of items proximate to the transponder and for receiving an interrogation signal and transmitting, in response thereto a responsive signal having stored item data therein, said item data at least identifying each of a plurality of unique types of items stored proximate to each one of the transponders;

a radio frequency transceiver means having a radio frequency transmitting means for sending an interrogation signal within a range of positions proximate to the radio frequency transceiver means and a radio frequency receiving means for receiving responsive signals from proximate radio frequency transponders and for providing a signal indicative of the item data in the responsive signals;

a control means adapted to receive the signal from the radio receiver means and further adapted to determine an output based upon the received signal from the radio frequency receiver means; and a display means for generating an output in a human visible form;

wherein said control means is further adapted for causing said display to present an output is based upon the received signal from the radio receiver means, said output being indicative of proximate items.

* * * * *

UNITED STATES PATENT AND TRADEMARK OFFICE
CERTIFICATE OF CORRECTION

PATENT NO. : 7,372,360 B2
APPLICATION NO. : 11/008530
DATED : May 13, 2008
INVENTOR(S) : Joseph A. Vaiana It is certified that error appears in the above-identified patent and that said Letters Patent is hereby corrected as shown below:

| | |
|---|---|
| First page, (56) References Cited U.S. PATENT DOCUMENTS, 1st entry | Delete "4,656,563 A 4/1987 Segoshi et al. 340/573.4" and insert --4,656,463 A 4/1987 Anders et al. 340/573.4--, therefor. |
| First page, (56) References Cited U.S. PATENT DOCUMENTS, 4th entry | For 5,821,513, delete "O'Hagen et al." and insert --O'Hagan et al.--, therefor. |
| Claim 1, Col. 10, line 19 | In Claim 1, after "information" insert --system--. |
| Claim 1, Col. 10, lines 22-23 | In Claim 1, delete "transponder;" and insert --transponder said item information at least identifying each of a plurality of unique types of items stored on the display shelves proximate to each one of the transponders;--, therefor. |
| Claim 4, Col. 10, lines 49-50 | In Claim 4, delete "includes data from which the control circuit can determine at least one an item" and insert --stored in each of the transponders includes at least one of an item--, therefor. |
| Claim 38, Col. 14, line 4 | In Claim 38, delete "The" and insert --An--, therefor. |

Signed and Sealed this

Twenty-fifth Day of August, 2009

David J. Kappos

David J. Kappos
*Director of the United States Patent and Trademark Office*